US012783063B2

(12) United States Patent
Chen et al.

(10) Patent No.: US 12,783,063 B2
(45) Date of Patent: Nov. 3, 2026

(54) VIRTUAL REALITY CONTROL SYSTEM

(71) Applicant: COOLER MASTER TECHNOLOGY INC., Taipei City (TW)

(72) Inventors: Chun-Ta Chen, Taipei City (TW); Yao Shiao, Taipei City (TW); Shang-Che Lee, Taipei City (TW); Ming-Wan Lien, Taipei City (TW)

(73) Assignee: COOLER MASTER TECHNOLOGY INC., Taipei City (TW)

( * ) Notice: Subject to any disclaimer, the term of this patent is extended or adjusted under 35 U.S.C. 154(b) by 0 days.

(21) Appl. No.: 19/170,747

(22) Filed: Apr. 4, 2025

(65) Prior Publication Data

US 2025/0328199 A1 Oct. 23, 2025

(30) Foreign Application Priority Data

Apr. 22, 2024 (TW) ................................ 113114853

(51) Int. Cl.
*G06F 3/0346* (2013.01)

(52) U.S. Cl.
CPC .................................. *G06F 3/0346* (2013.01)

(58) Field of Classification Search
CPC .. G06F 3/0346; G06F 2203/013; G06F 3/016; G06F 3/011; A63F 13/28; A63F 13/42; A63F 13/90
See application file for complete search history.

(56) References Cited

U.S. PATENT DOCUMENTS

| | | | | |
|---|---|---|---|---|
| 2017/0336878 | A1* | 11/2017 | Iyer | G06F 3/0346 |
| 2017/0357327 | A1* | 12/2017 | Dimitrov | G06F 3/012 |
| 2021/0046391 | A1* | 2/2021 | Board | A63G 31/16 |

* cited by examiner

*Primary Examiner* — Matthew A Eason
*Assistant Examiner* — Chayce R Bibbee
(74) *Attorney, Agent, or Firm* — Merchant & Gould P.C.

(57) ABSTRACT

A virtual reality control systems includes a base, a dynamic carrier that is disposed on the base and is configured to move along at least one rotational axis, and a control device that is connected to the dynamic carrier and is configured to determine a virtual rotation angle corresponding to a virtual operation, convert the virtual rotation angle into a carrier rotation angle, and control the rotational movement of the dynamic carrier based on the carrier rotation angle. The angle conversion function maps a virtual angle range to a carrier angle range in a nonlinear manner, such that the virtual rotation angle is within the virtual angle range and the carrier rotation angle is within the carrier angle range.

20 Claims, 8 Drawing Sheets

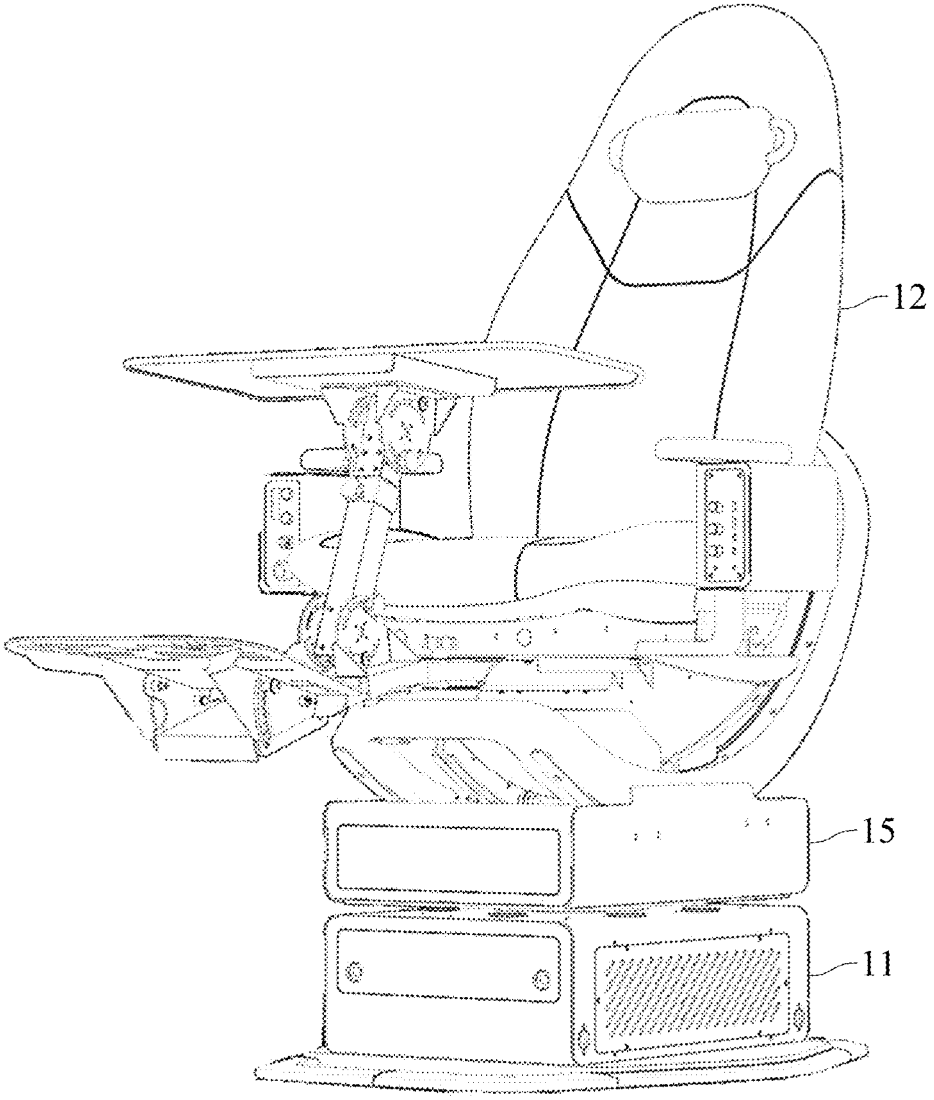
FIG. 2
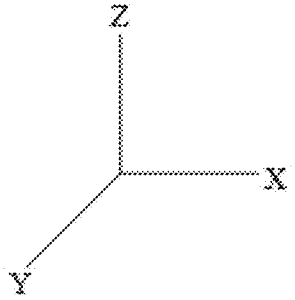

VIRTUAL REALITY CONTROL SYSTEM

CROSS-REFERENCE TO RELATED APPLICATIONS

This U.S. application claims the benefits of priority to Taiwan application No. 113114853, filed on Apr. 22, 2024, titled "VIRTUAL REALITY SOMATOSENSORY CONTROL SYSTEM, METHOD AND ANGLE CONVERSION FUNCTION GENERATION METHOD" of which is incorporated herein by reference in its entirety.

BACKGROUND

In virtual reality, dynamic platforms are constrained by hardware mechanisms and physical limitations, restricting their range of rotational movement. However, in virtual reality with a wide range of freedom, particularly in gaming, it offers unrestricted freedom of rotation. This disparity creates a mismatch between the physical movements of the user and the virtual experience, diminishing immersion. Therefore, a critical challenge in the field is developing solutions that bridge this gap, providing a more seamless and realistic user experience.

SUMMARY

In general terms, this disclosure is directed to a virtual reality control system. In some embodiments, and by non-limiting example, the disclosure is particularly directed to a Virtual Reality Somatosensory Control system, Control Method and Angle Conversion Function Generation Method.

One aspect of the present disclosure provides a virtual reality control system. The system includes a base, a dynamic carrier that is disposed on the base and is configured to move along at least one rotational axis, and a control device that is connected to the dynamic carrier and is configured to determine a virtual rotation angle corresponding to a virtual operation, convert the virtual rotation angle into a carrier rotation angle, and control the rotational movement of the dynamic carrier based on the carrier rotation angle, wherein the angle conversion function maps a virtual angle range to a carrier angle range in a nonlinear manner, such that the virtual rotation angle is within the virtual angle range and the carrier rotation angle is within the carrier angle range.

In one embodiment, the virtual angle range is greater than the carrier range.

In one embodiment, the system further includes a computing device that is connected to the control device, the computing device being configured to: determine multiple simulated rotation angles corresponding to multiple simulated operations, each simulated rotation angle being within a simulated angle range, define a normal angle range based on the frequency of occurrence of the simulated rotation angles, determine the carrier angle range and define a commonly used angle range within the carrier angle range, and define the angle conversion function based on the simulated angle range, the normal angle range, the carrier angle range, and the commonly used angle range.

In one embodiment, the computing device is further configured to: obtain a model function, determine a first coefficient of the model function based on the carrier angle range, and determine a second coefficient of the model function based on the virtual angle range, the normal angle range, and the commonly used angle range.

In one embodiment, the model function is defined as: y=a*tanh(bx), where y is the carrier control angle, x is the virtual angle, a is the first coefficient, and b is the second coefficient.

In one embodiment, the carrier angle range includes a first sub-range and a second sub-range, and the computing device is configured to: obtain a segmented model function, determine a first coefficient for a first segment of the model function based on the first sub-range of the carrier angle range, determine a second coefficient for the first segment based on the virtual angle range, the normal angle range, and the commonly used angle range, determine a third coefficient for a second segment of the model function based on the second sub-range of the carrier angle range, and determine a fourth coefficient for the second segment based on the virtual angle range, the normal angle range, and the commonly used angle range.

In one embodiment, the segmented model function is defined as:

$$y = \begin{cases} a1 * \tanh(b1x), & x < 0 \\ a2 * \tanh(b2x), & x \geq 0 \end{cases},$$

where y is the carrier control angle, x is the virtual angle, a1 and b1 are coefficients corresponding to the first subrange, and a2 and b2 are coefficients corresponding to the second subrange.

In one embodiment, the system further comprises a computing device that is configured to: determine multiple first simulated rotation angles corresponding to a first rotational axis and multiple second simulated rotation angles corresponding to a second rotational axis, wherein the first simulated rotation angles are within a first simulated angle range and the second simulated rotation angles are within a second simulated angle range, define a first normal angle range based on the frequency of occurrence of the first simulated rotation angles and a second normal angle range based on the frequency of occurrence of the second simulated rotation angles, determine a first carrier angle range and a second carrier angle range, and define a first commonly used angle range within the first carrier angle range and a second commonly used angle range within the second carrier angle range, define a first angle conversion function based on the first simulated angle range, the first normal angle range, the first carrier angle range, and the first commonly used angle range, and define a second angle conversion function based on the second simulated angle range, the second normal angle range, the second carrier angle range, and the second commonly used angle range.

Another aspect of the present disclosure provides a virtual reality control method executed by a control device. The method includes determining a virtual rotation angle corresponding to a virtual operation, converting the virtual rotation angle into a carrier rotation angle using an angle conversion function, and controlling the rotational movement of a dynamic carrier based on the carrier rotation angle, wherein the angle conversion function maps a virtual angle range to a carrier angle range in a nonlinear manner, such that the virtual rotation angle is within the virtual angle range and the carrier rotation angle is within the carrier angle range.

In one embodiment, the virtual angle range is greater than the carrier angle range.

In one embodiment, the method further includes determining multiple simulated rotation angles corresponding to multiple simulated operations, each simulated rotation angle being within a simulated angle range, defining a normal angle range based on the frequency of occurrence of the simulated rotation angles, determining the carrier angle range and defining a commonly used angle range within the carrier angle range, and defining the angle conversion function based on the simulated angle range, the normal angle range, the carrier angle range, and the commonly used angle range.

In one embodiment, defining the angel conversion function includes obtaining a model function, determining a first coefficient of the model function based on the carrier angle range, and determining a second coefficient of the model function based on the virtual angle range, the normal angle range, and the commonly used angle range.

In one embodiment, the model function is defined as: y=a*tanh(bx), where y is the carrier control angle, x is the virtual angle, a is the first coefficient, and b is the second coefficient.

In one embodiment, defining the angel conversion function includes obtaining a segmented model function, determining a first coefficient for a first segment of the model function based on a first sub-range of the carrier angle range, determining a second coefficient for the first segment based on the virtual angle range, the normal angle range, and the commonly used angle range, determining a third coefficient for a second segment of the model function based on a second sub-range of the carrier angle range, and determining a fourth coefficient for the second segment based on the virtual angle range, the normal angle range, and the commonly used angle range.

In one embodiment, the segmented model function is defined as:

$$y = \begin{cases} a1 * \tanh(b1x), & x < 0 \\ a2 * \tanh(b2x), & x \geq 0 \end{cases},$$

where y is the carrier control angle, x is the virtual angle, a1 and b1 are coefficients corresponding to the first subrange, and a2 and b2 are coefficients corresponding to the second subrange.

In one embodiment, the method further includes determining multiple first simulated rotation angles corresponding to a first rotational axis and multiple second simulated rotation angles corresponding to a second rotational axis, wherein the first simulated rotation angles are within a first simulated angle range and the second simulated rotation angles are within a second simulated angle range, defining a first normal angle range based on the frequency of occurrence of the first simulated rotation angles and a second normal angle range based on the frequency of occurrence of the second simulated rotation angles, determining a first carrier angle range and a second carrier angle range, and define a first commonly used angle range within the first carrier angle range and a second commonly used angle range within the second carrier angle range, defining a first angle conversion function based on the first simulated angle range, the first normal angle range, the first carrier angle range, and the first commonly used angle range, and defining a second angle conversion function based on the second simulated angle range, the second normal angle range, the second carrier angle range, and the second commonly used angle range.

Still another aspect of the present disclosure provides a method for generating an angle conversion function executed by a computing device within a virtual reality control system. The method includes determining multiple simulated rotation angles corresponding to multiple simulated operations, each simulated rotation angle being within a simulated angle range, defining a normal angle range based on the frequency of occurrence of the simulated rotation angles, determining the carrier angle range and define a commonly used angle range within the carrier angle range, and defining the angle conversion function based on the simulated angle range, the normal angle range, the carrier angle range, and the commonly used angle range.

In one embodiment, defining the angle conversion function further comprises obtaining a model function, determining a first coefficient of the model function based on the carrier angle range, and determining a second coefficient of the model function based on the virtual angle range, the normal angle range, and the commonly used angle range, wherein the model function is defined as: y=a*tanh(bx), where y is the carrier control angle, x is the virtual angle, a is the first coefficient, and b is the second coefficient.

In one embodiment, defining the angle conversion function further comprises obtaining a segmented model function, determining a first coefficient for a first segment of the model function based on a first sub-range of the carrier angle range, determining a second coefficient for the first segment based on the virtual angle range, the normal angle range, and the commonly used angle range, determining a third coefficient for a second segment of the model function based on q second sub-range of the carrier angle range, and determining a fourth coefficient for the second segment based on the virtual angle range, the normal angle range, and the commonly used angle range, wherein the segmented model function is defined as:

$$y = \begin{cases} a1 * \tanh(b1x), & x < 0 \\ a2 * \tanh(b2x), & x \geq 0 \end{cases},$$

where y is the carrier control angle, x is the virtual angle, a1 and b1 are coefficients corresponding to the first subrange, and a2 and b2 are coefficients corresponding to the second subrange.

In one embodiment, the method further comprises determining multiple first simulated rotation angles corresponding to a first rotational axis and multiple second simulated rotation angles corresponding to a second rotational axis, wherein the first simulated rotation angles are within a first simulated angle range and the second simulated rotation angles are within a second simulated angle range, defining a first normal angle range based on the frequency of occurrence of the first simulated rotation angles and a second normal angle range based on the frequency of occurrence of the second simulated rotation angles, determining a first carrier angle range and a second carrier angle range, and define a first commonly used angle range within the first carrier angle range and a second commonly used angle range within the second carrier angle range, defining a first angle conversion function based on the first simulated angle range, the first normal angle range, the first carrier angle range, and the first commonly used angle range, and defining a second angle conversion function based on the second simulated angle range, the second normal angle range, the second carrier angle range, and the second commonly used angle range.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 2 is a schematic diagram of the base and dynamic platform of the virtual reality somatosensory control system according to one embodiment of the present disclosure.

DETAILED DESCRIPTION

Figure 1:
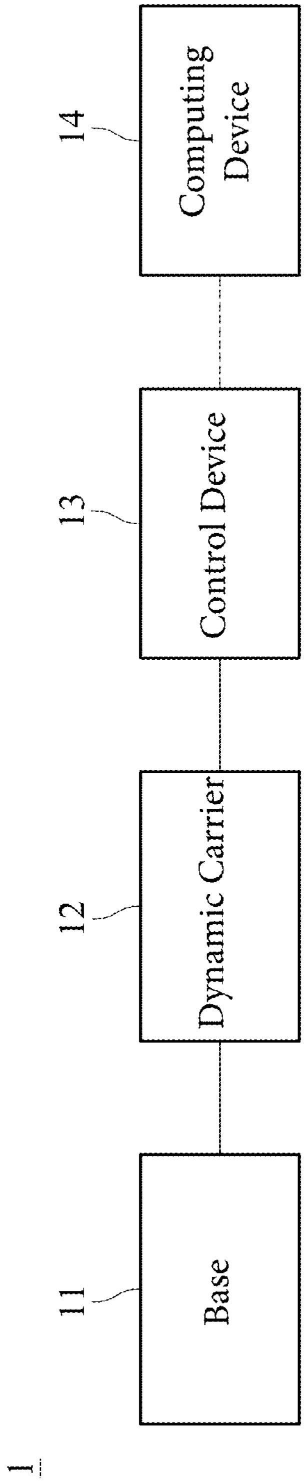
FIG. 1 is a block diagram illustrating a virtual reality somatosensory control system according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIG. 1. FIG. 1 is a block diagram illustrating a virtual reality somatosensory control system according to one embodiment of the present disclosure. As an example illustrated in FIG. 1, the virtual reality somatosensory system 1 includes a base 11, a dynamic carrier 12, a control device 13, and a computing device 14.

The base 11 serves as the foundation that supports the dynamic carrier 12. In one embodiment, the base 11 acts as a fixed reference point for the dynamic carrier 12, providing a stable and secure foundation for the dynamic carrier 12 to operate safely and ensure accurate rotational motion.

The dynamic carrier 12 is mounted to the base 11 and is configured to move relative to the base 11 along at least one predefined rotational axis under controlled conditions. In one embodiment, the dynamic carrier 12 can rotate and move around the predefined rotational axis to a specific degree. In other words, the movement along the axis is governed by controlled conditions.

The control device 13 is connected to the dynamic carrier 12 and is in charge of determining a virtual rotation angle that corresponds to a virtual operation. The control device 13 utilizes an angle conversion function to convert the virtual rotation angle into a platform rotation angle and then controls the rotational movement of the dynamic carrier 12 accordingly.

In one embodiment, the angle conversion function is designed to map a virtual angle range to a platform angle range in a nonlinear approach. The virtual rotation angle falls within the virtual angle range, while the platform rotation angle falls within the platform angle range. The nonlinear mapping helps bridge the gap between unrestricted virtual movement and the physical limitations of the dynamic platform. The above design above allows more versatile and realistic interactions between virtual inputs and their physical counterparts, enhancing the overall system operation and user experience.

In one embodiment, the virtual reality somatosensory control system 1 may further include a feedback device, such as a vibration generator, speaker, or light-emitting element, or any of the foregoing combinations.

In addition to controlling the rotation of the dynamic carrier 12, the control device 13 can also trigger additional sensory feedback. For example, when the platform rotation angle exceeds a predefined threshold, the control device 13 can activate the feedback device to provide haptic, audio, or visual feedback, such as vibration feedback, sound alerts, or light signals. The feedback device enhances the immersive experience by synchronizing real-world physical sensations with virtual movements.

Referring to FIG. 1 along with FIG. 2. FIG. 1 is a block diagram illustrating a virtual reality somatosensory control system according to one embodiment of the present disclosure. FIG. 2 is a schematic diagram of the base and dynamic platform of the virtual reality somatosensory control system according to one embodiment of the present disclosure.

As an example illustrated in FIG. 2, motors (not shown) corresponding to different rotational axes may be installed within the base 11, the dynamic carrier 12, and a bridging platform 15. These motors control the rotational motion of the dynamic carrier 12 along different axes. Specifically, the dynamic carrier 12 has three rotational axes relative to the base 11. For example, the X-axis corresponds to the rotational movement of dynamic carrier 12 in the left-right direction, the Y-axis corresponds to the rotational movement of dynamic carrier 12 in the front-back direction, and the Z-axis corresponds to the rotational movement of dynamic carrier 12 in the up-down direction.

Further, the dynamic carrier 12 has different angle ranges along each rotational axis. For example, the X-axis has an angular range of ±90 degrees, the Y-axis has an angular range of +20 degrees and −40 degrees, and the Z-axis has an angular range of ±18 degrees.

In one embodiment, the dynamic carrier 12 is implemented as a seat, allowing the user to sit and experience an immersive virtual reality sensation through rotational motion. However, the embodiment is not limited thereto. In another embodiment, the bridging platform 15 may not be present between the base 11 and the dynamic carrier 12; namely, the dynamic carrier 12 may be controlled to move along X-axis or Y-axes relative to the base 11.

In one embodiment, the control device 13 controls the dynamic carrier 12 to move along at least one rotational axis via the base 11. The control device 13 may include one or more processing/control units (not shown) with functions such as data reception, recording, computation, storage, and output. The processing/control unit may be a microcontroller, central processing unit (CPU), graphics processing unit (GPU), programmable logic controller (PLC), or any combination thereof. For example, the control device 13 can be connected to a gaming console and determine a virtual rotation angle corresponding to a virtual operation from the gaming console. The control device 13 then converts the virtual rotation angle into a carrier rotation angle using an angle conversion function and controls the rotational motion of the dynamic carrier 12 accordingly.

Figure 3:
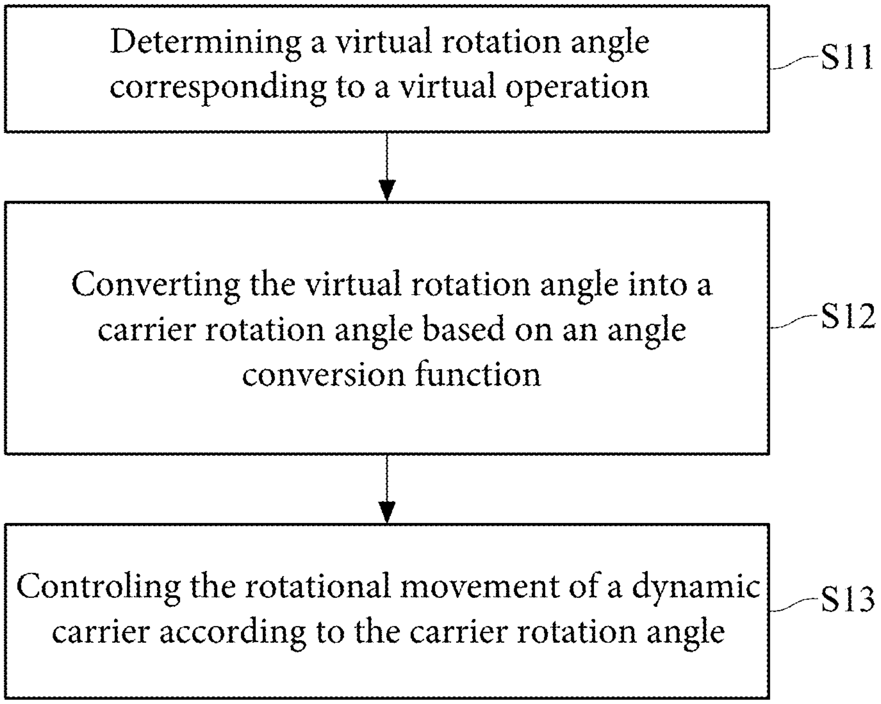
FIG. 3 is a flowchart of the virtual reality somatosensory control method according to one embodiment of the present disclosure.

Referring to FIG. 1 along with FIG. 3. FIG. 1 is a block diagram illustrating a virtual reality somatosensory control system according to one embodiment of the present disclosure. FIG. 3 is a flowchart of the virtual reality somatosensory control method according to one embodiment of the present disclosure. As an example illustrated in FIG. 3, the virtual reality motion-sensing control method executed by the control device 13 includes steps S11, S12, and S13.

Specifically, S11 is performed to determine a virtual rotation angle corresponding to a virtual operation. S12 is subsequently performed to convert the virtual rotation angle into a carrier rotation angle based on an angle conversion function. Further, S13 is performed to control the rotational movement of a dynamic carrier according to the carrier rotation angle.

In one embodiment, the angle conversion function is used to map a virtual angle range to a carrier angle range in a nonlinear manner. The virtual rotation angle falls within the virtual angle range, while the carrier rotation angle falls within the carrier angle range.

Figure 4:
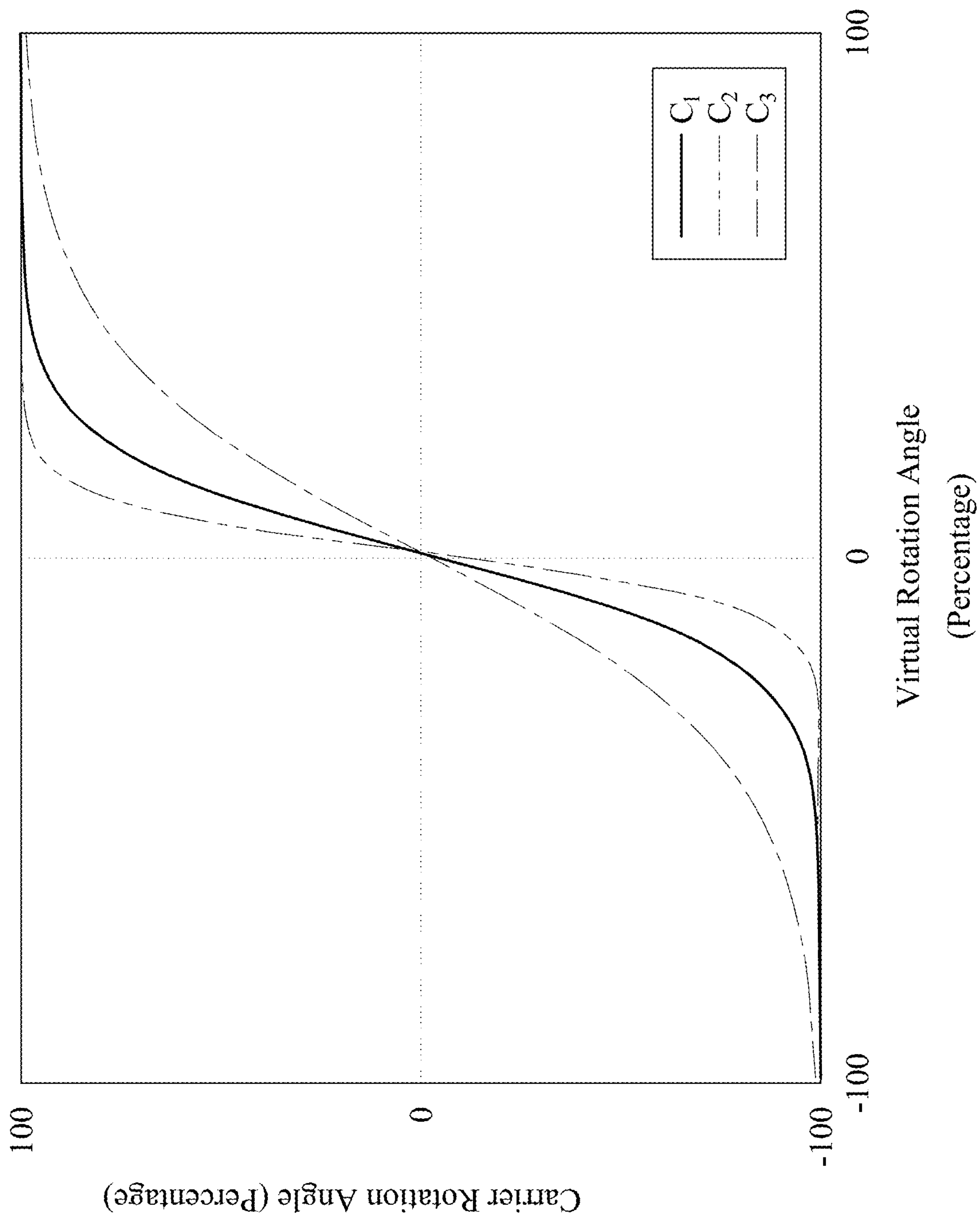
FIG. 4 is a schematic diagram illustrating the angle conversion function according to one embodiment of the present disclosure.

Referring to FIG. 3 along with FIG. 4. FIG. 3 is a flowchart of the virtual reality somatosensory control method according to one embodiment of the present disclosure. FIG. 4 is a schematic diagram illustrating the angle conversion function according to one embodiment of the present disclosure. As an example illustrated in FIG. 4, function curves C1, C2, and C3 represent angle conversion functions corresponding to the X, Y, and Z axis, respectively. By inputting different virtual rotation angles, the angle conversion function can non-linearly map them to obtain different carrier rotation angles.

In step S11, the control device 13 determines the virtual rotation angle corresponding to the virtual operation, where the virtual rotation angle falls within a predefined virtual angle range. Further, the control device 13 divides the acquired virtual rotation angle by the virtual angle range to determine a proportional value of the virtual rotation angle (as shown on the horizontal axis of the chart in FIG. 4).

In step S12, the control device 13 converts the virtual rotation angle into a carrier rotation angle based on the angle conversion function illustrated in FIG. 4. In other words, it determines the carrier rotation angle corresponding to the virtual rotation angle (as shown on the vertical axis of the chart in FIG. 4).

In one embodiment, the virtual rotation angle range in a virtual environment differs from the carrier angle range in which the dynamic carrier 12 operates. Specifically, the virtual angle range in a game can be larger than the carrier angle range of the dynamic carrier 12. For example, the virtual angle range may be ±70 degrees, while the carrier angle range may be ±20 degrees. In this case, the control device 13 maps the virtual angle range (±70 degrees) non-linearly to the carrier angle range (±20 degrees) of the dynamic carrier 12.

In step S13, the control device 13 controls the rotational movement of the dynamic carrier 12 based on the carrier rotation angle. The operation of step S13 ensures that when the user experiences rotational movement on the dynamic carrier 12, the perceived physical sensation closely matches the changes in the virtual rotation angle, thereby enhancing the immersive experience.

In the embodiment, the angle conversion function may be pre-stored or pre-set in the control device 13, or it may be generated by the computing device 14 and provided to the control device 13. Specifically, computing device 14 may include one or more processors that receive data, record, compute, store, and output functions. These processors may include microcontrollers, central processing units (CPUs), graphics processing units (GPUs), programmable logic controllers (PLCs), or any combination thereof.

For example, the computing device 14 can be connected to a gaming console and the dynamic carrier 12, receiving the virtual rotation angle corresponding to virtual operations from the gaming console, receiving the dynamic angle range of the dynamic carrier 12, and generating or defining the angle conversion function. In one embodiment, the control device 13 and the computing device 14 are the same device, but the embodiment is not limited thereto. In other embodiments, the control device 13 and the computing device 14 can be different devices. For example, the control device 13 and the computing device 14 can be connected via wired or wireless communication when they are separate devices.

In one embodiment, the computing device 14 is a cloud computing server, while the control device 13 is a client computer. When the client computer (control device 13) is offline and not connected to the cloud computing server (computing device 14), the computing device 14 can operate as illustrated below: determining game data parameters (including tilt angle, left-right rotation angle, and three-axis acceleration); determining the resolution frequency; identifying the maximum and minimum values of each parameter to define parameter ranges; designating parameters closer to their maximum and minimum values as special events; adjusting one or more custom coefficients of the angle conversion function to optimize physical feedback configuration and complete the angle conversion function model. In other words, when not connected with the client computer (control device 13), the cloud computing server (computing device 14) can construct and update the angle conversion function model. When the client computer (control device 13) reconnects with the cloud computing server (computing device 14), the updated model is provided to the control device 13, allowing it to execute the control process described in steps S11 to S13 of FIG. 3.

In one embodiment, when the client computer (control device 13) is online and connected to the cloud computing server (computing device 14), the control device 13 operate as illustrated below: receiving game data parameters (including tilt angle, left-right rotation angle, three-axis acceleration, and special events); determining the resolution frequency; converting received parameters into three-dimensional motor control signals; controlling the rotation movement of the dynamic carrier 12 based on the three-dimensional motor signals as described in step S13.

In one embodiment, the control device 13 further operate as illustrated below: detecting special events; providing additional sensory feedback (such as vibration, lighting, or sound feedback) through a prompting device when a special event occurs, transmitting data to the seat (including base 11 and dynamic carrier 12).

In one embodiment, if the control device 13 and the computing device 14 are integrated into a single device that serves as both the control and computing functions, the integrated device can individually perform the model construction, updates, and control processes described above.

The aforementioned special events are extraordinary circumstances in games or events requiring special sensory experiences. Specifically, the control device 13 can determine that a special event has occurred if the virtual rotation angle exceeds a normal angle range. If the virtual rotation angle does not exceed this normal angle range, it is considered a standard event. A more detailed description of the normal angle range is provided later (see FIG. 6).

For example, takeoff and landing in a flight simulation game may be classified as standard events, while a crash may be classified as a special event. Additionally, the cloud computing server (computing device 14) can collect large amounts of game data parameters by using big data methods to refine the game database, improving the accuracy of model construction.

In one embodiment, the virtual reality motion control system 1 may include one or more safety detection components to detect whether any foreign objects are approaching within a predefined range of the dynamic carrier 12. In this case, the control device 13 can receive warning signals from the safety detection components and, upon receiving such signals, control the motor to slow down or stop operation. For example, the safety detection components could be distance sensors, such as ultrasonic sensors or optical sensors, to detect foreign objects in the surrounding environment.

Figure 5:
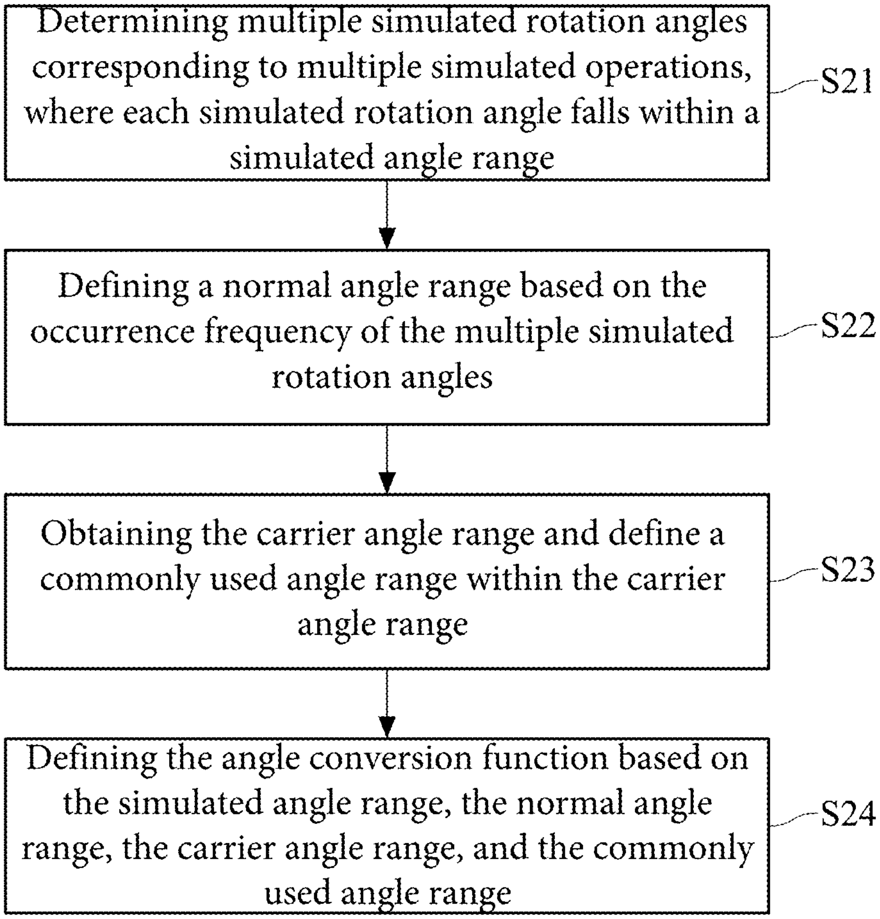
FIG. 5 is a flowchart of the angle conversion function generation method according to one embodiment of the present disclosure.

Referring to FIG. 5 along with FIG. 1. FIG. 5 is a flowchart of the angle conversion function generation method according to one embodiment of the present disclosure. FIG. 1 is a block diagram illustrating a virtual reality somatosensory control system according to one embodiment of the present disclosure. As an example illustrated in FIG. 5, the method executed by the computing device 14 for generating the angle conversion function includes steps S21, S22, S23, and S24.

Specifically, S21 is performed to determine multiple simulated rotation angles corresponding to multiple simulated operations, where each simulated rotation angle falls within a simulated angle range. S22 is performed to define a normal angle range based on the occurrence frequency of the multiple simulated rotation angles. S23 is performed to determine the carrier angle range and define a commonly used angle range within the carrier angle range. S24 is performed to define the angle conversion function based on the simulated angle range, the normal angle range, the carrier angle range, and the commonly used angle range.

Figure 6:
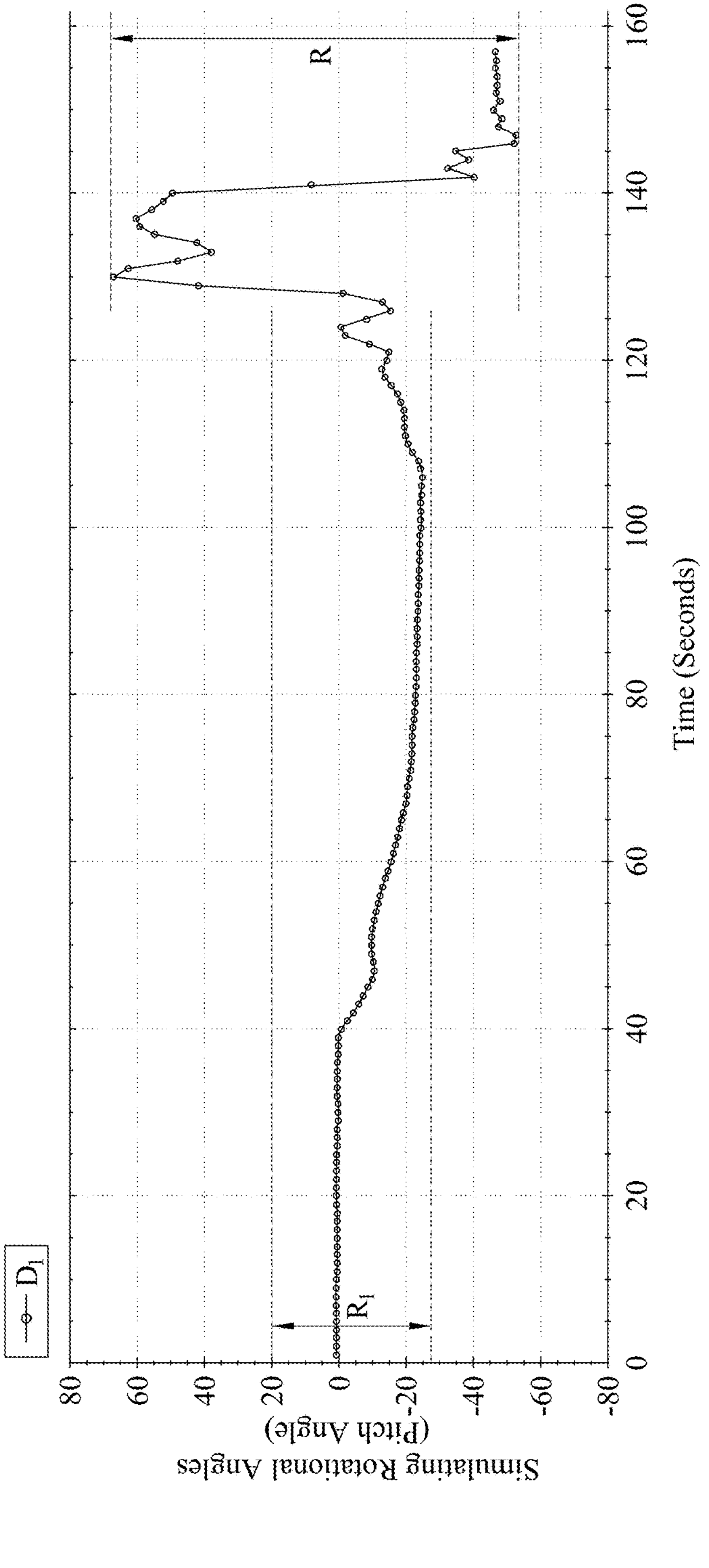
FIG. 6 is a schematic diagram illustrating the execution of steps S21 and S22 for simulating rotational angles (pitch angle) according to the embodiment of FIG. 5.
Figure 7:
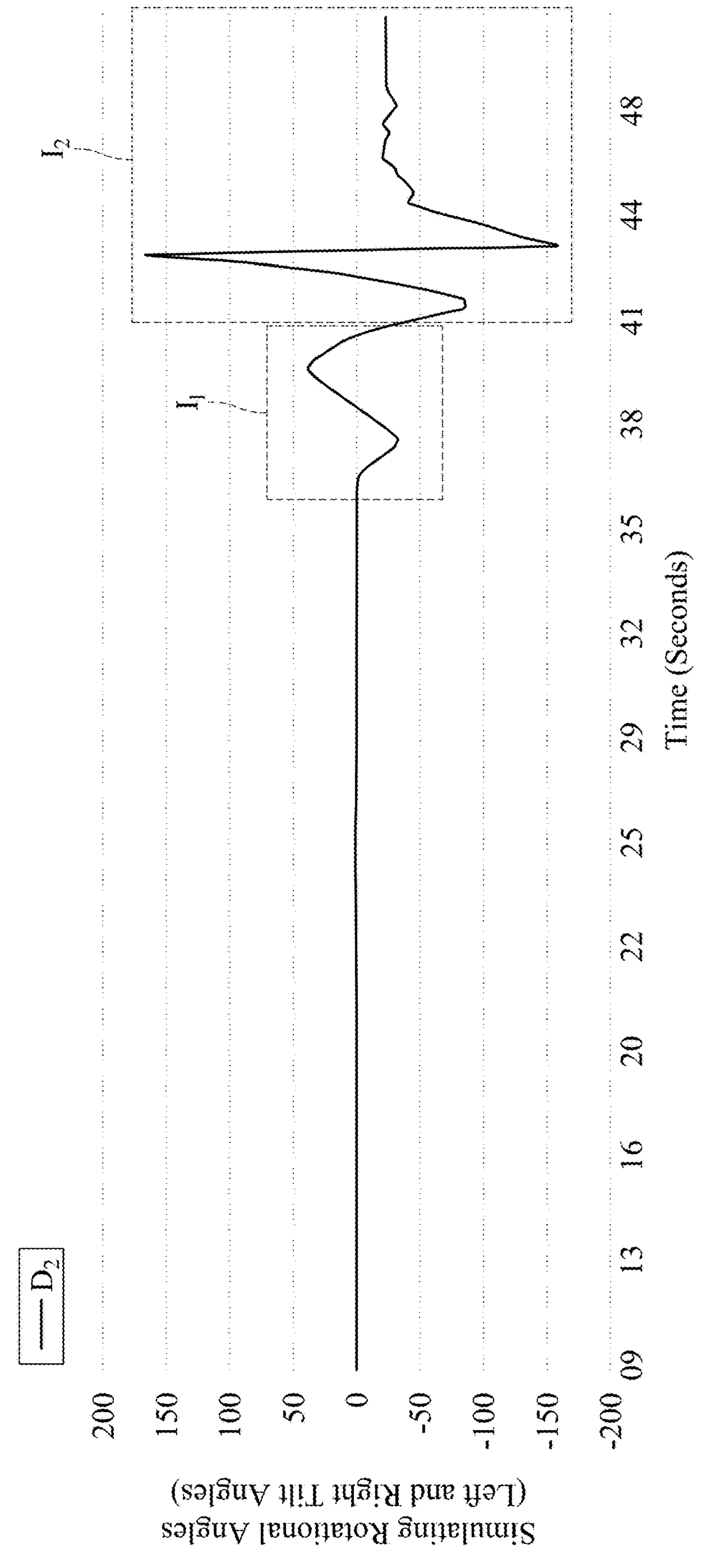
FIG. 7 is a schematic diagram illustrating the execution of steps S21 and S22 for simulating rotational angles (left and right tilt angles) according to the embodiment of FIG. 5.

Referring to FIGS. 6 and 7 along with FIG. 5. FIG. 6 is a schematic diagram illustrating the execution of steps S21 and S22 for simulating rotational angles (pitch angle) according to the embodiment of FIG. 5. FIG. 7 is a schematic diagram illustrating the execution of steps S21 and S22 for simulating rotational angles (left and right tilt angles) according to the embodiment of FIG. 5. FIG. 5 is a flowchart of the angle conversion function generation method according to one embodiment of the present disclosure.

As an example illustrated in FIGS. 6 and 7, the computing device 14 determines multiple simulated rotation angles from the game console at different time points, as performed in step S21. FIGS. 6 and 7 respectively correspond to simulated rotation angles along different rotation axes. In step S22, the computing device 14 records the occurrence frequency of multiple simulated rotation angles and defines a normal angle range.

As an example illustrated in FIG. 6, multiple angle data points D1 fall within the simulated angle range R. Among these data points D1, the majority (e.g., 90%) of the rotation angles fall within a normal angle range R1 of approximately ±20 degrees. Therefore, the computing device 14 can define ±20 degrees as a normal angle range based on the occurrence frequency of the simulated rotation angles.

As an example illustrated in FIG. 7, among multiple angle data points D2, some correspond to standard events I1, while others correspond to special events I2. For example, standard events I1 in a flight simulation game involving smaller rotation angles correspond to the aircraft tilting left or right. Additionally, special events I2 that involve extreme rotation angles correspond to situations such as a plane crash. When the control device 13 detects a special event 12, it can control a feedback device to provide additional sensory feedback (e.g., vibration feedback, light feedback, sound feedback, etc.).

As an example operation in step S23, the computing device 14 determines the carrier angle range of the dynamic carrier 12 during rotation and defines a commonly used angle range within the carrier angle range, excluding extreme values. For example, if the carrier angle range is within ±20 degrees, the commonly used angle range can be defined as within ±15 degrees. The commonly used angle range can be adjusted or defined by the user through different methods, such as the computing device 14 receiving input from a user interface for updates or adjusting it based on an evaluation of big data historical records of the dynamic carrier 12 rotation angles.

As an example operation in step S24, the computing device 14 defines an angle conversion function based on the simulated angle range, normal angle range, carrier angle range, and commonly used angle range. In one embodiment, the computing device 14 operate as illustrated below: obtaining a model function; determining a first coefficient of the model function based on the carrier angle range; determining a second coefficient of the model function based on the simulated angle range, normal angle range, and commonly used angle range. Specifically, the model function can be represented by the following Equation (1).

$$y = a * \tanh(bx). \qquad \text{Equation (1)}$$

In Equation (1), y represents the carrier control angle, x is the virtual rotation angle, a is the first coefficient, and b is the second coefficient.

Figure 8:
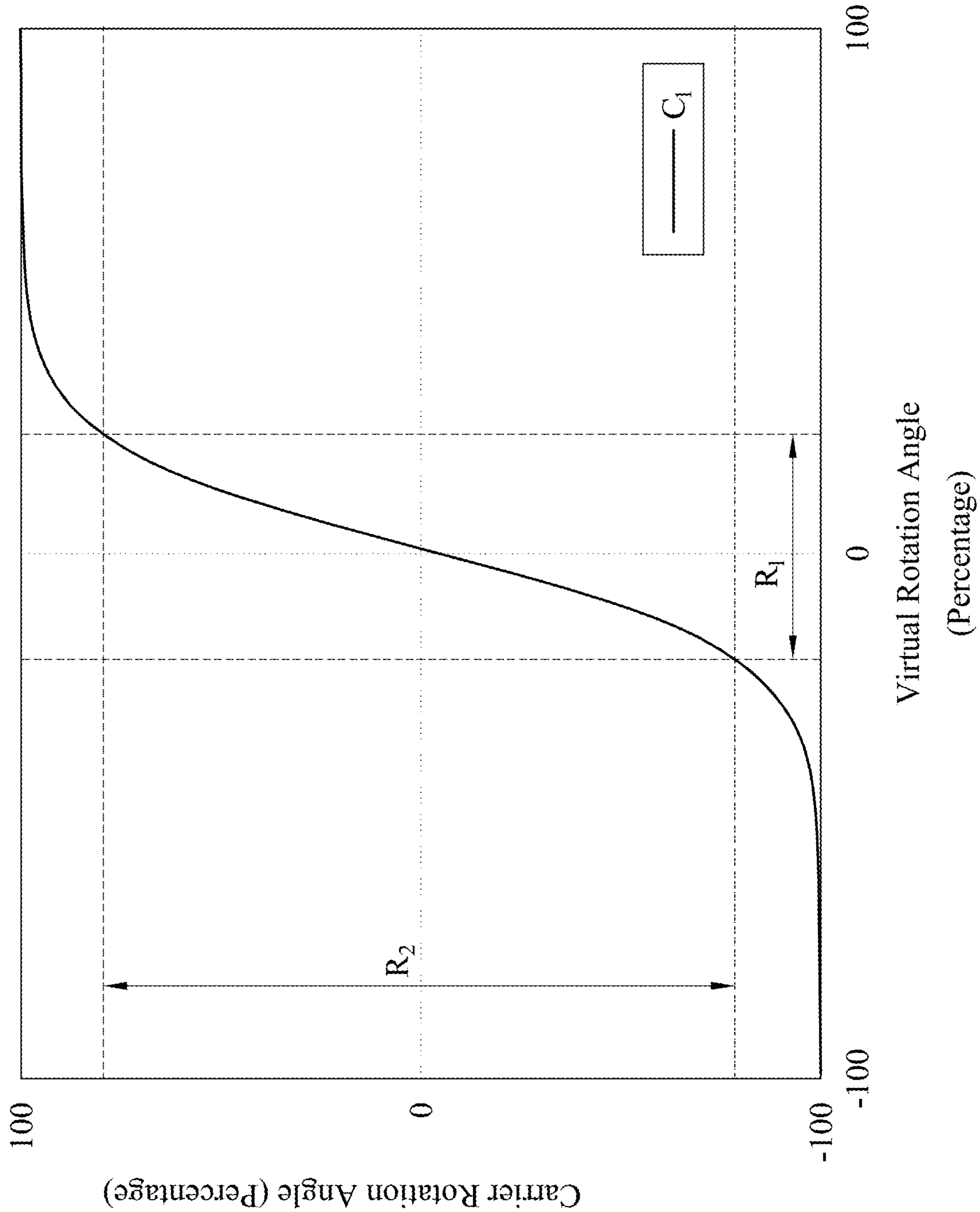
FIG. 8 is a schematic diagram illustrating step S24 of generating the angle conversion function according to the embodiment of FIG. 5.

FIG. 8 is a schematic diagram illustrating step S24 of generating the angle conversion function according to the embodiment of FIG. 5. As an example illustrated in FIG. 8, the first coefficient a of the model function is associated with the range of the angle conversion function on the vertical axis (carrier rotation angle). Therefore, computing device 14 determines a based on the carrier angle range. For example, if the carrier angle range is within ±20 degrees, the first coefficient a can be set to 20. The second coefficient b is related to the range of the angle conversion function on the horizontal axis (virtual rotation angle) and the slope of the middle section. Therefore, computing device 14 determines b based on the virtual angle range, the normal angle range, and the commonly used angle range.

For example, if the normal virtual operation angle range $R_1$ is within ±20 degrees and the dynamic carrier's commonly used angle range $R_2$ is within ±15 degrees, adjusting the second coefficient b allows the angle conversion function to align with the intersection of $R^1$ and $R_2$.

In one embodiment, the model function is not limited to Equation (1). An alternative function can be expressed as follows:

$$y = -a * \frac{1}{1 + e^{bx}} - c. \qquad \text{Equation (2)}$$

Similar to Equation (1), in Equation (2), the first coefficient a is associated with the carrier angle range, while the second coefficient b relates to the horizontal axis range (virtual rotation angle) and the middle section's slope. Therefore, the computing device 14 determines b based on the virtual angle range, normal angle range, and commonly used angle range. Additionally, Equation (2) introduces a third coefficient c, which serves as a translation coefficient to adjust the center point of the angle conversion function.

By applying the angle conversion generated through the abovementioned method: for virtual rotation angles within $R_1$, the computing device 14 applies a steeper slope: mapping them to carrier rotation angles within R for virtual rotation angles outside $R_1$, the computing device 14 applies a gentler slope, mapping them to carrier rotation angles beyond $R_2$. The application described above ensures that frequently occurring virtual rotation angles in $R_1$ correspond to more dynamic carrier rotation angles in the dynamic carrier 12, enhancing the user's immersive experience.

The dynamic carrier 12 has a carrier angle range along a specific rotation axis, divided into a first subrange (negative values), and a second subrange (zero and positive values). For example, if the carrier angle range is −40° to +20°, the first subrange spans from −40° to 0°, while the second subrange spans from 0° to +20°. In this scenario, the computing device 14 executes the following operations: acquiring a piecewise-defined model function; determining the first coefficient in the first subrange based on the carrier angle range; determining the second coefficient in the first subrange based on the virtual angle range, normal angle range, and commonly used angle range; determining the third coefficient in the second subrange based on the carrier angle range; determining the fourth coefficient in the second subrange based on the virtual angle range, normal angle range, and commonly used angle range. Specifically, the function can be expressed as the following Equation.

$$y = \begin{cases} a1 * \tanh(b1x), & x < 0 \\ a2 * \tanh(b2x), & x \geq 0 \end{cases} \qquad \text{Equation (3)}$$

In Equation (3), y is the carrier control angle, x is the virtual angle, a1 (a first coefficient) and b1 (a second coefficient) are coefficients corresponding to the first subrange, while a2 (a third coefficient) and b2 (a fourth coefficient) are coefficients corresponding to the second subrange. As an example illustrated in FIG. 8, a1 is associated with the carrier rotation angle range below 0, meaning the computing device 14 determines a1 based on the first subrange. For example, if the first subrange is −20° to 0°, a1 can be set to −20. Similarly, b1 relates to the slope and range on the horizontal axis, determined based on virtual, normal, and commonly used angle ranges by the computing device 14. For the second subrange (0° to +40°), a2 can be set to 40, and b2 is determined using the same criteria as b1. In one embodiment, Equation (3) is a piecewise extension of Equation (1), but the embodiment is not limited thereto. In other embodiments, similar extensions can be made to Equation (2), for example, depending on the application. Alternatively, in certain situations, different forms of the model function define different interval ranges (e.g., using Equation (1) and Equation (2) at the same time), but the embodiment is not limited thereto.

In one embodiment, the computing device 14 can define separate angle conversion functions for different rotation axes based on virtual rotation angles and carrier rotation angles. For example, the device can execute the process in FIG. 5 for three rotation axes (X, Y, Z), generating respective angle conversion functions. For brevity, repeated descriptions of FIG. 5 are omitted.

In one embodiment, beyond determining angle conversion functions using Equations (1)-(3), the computing device 14 can also utilize curve fitting (e.g., regression analysis) to derive an optimal function based on angular data. With reference to FIG. 8, the operation process includes: marking multiple horizontal-axis points corresponding to the virtual angle range and $R_1$; marking multiple vertical-axis points corresponding to the carrier angle range and $R_2$; extending these points along their respective axes to determine multiple intersection points; using these intersection points to define an angle conversion function. In one embodiment, the function can be derived via curve fitting or local linear fitting to ensure steeper slopes within the overlap of $R_1$ and $R_2$, creating a segmented function with varying slopes.

In one embodiment, this system can also employ Dynamic Range Control (DRC), a technique similar to Equation (3), to apply different calculations to different sections, achieving a nonlinear transformation of virtual angles. It is important to note that "nonlinear" in this context refers to "non-uniform linearity". For example, in FIG. 8, after determining intersection points using extension lines, the system may apply local linear fitting instead of a single curve fitting approach, generating an angle conversion function with multiple segments and varying slopes.

The disclosed virtual reality motion control system and method utilize an angle conversion function to perform a nonlinear transformation of a virtual rotation angle into a carrier rotation angle. This transformed angle is then used to control the dynamic carrier's motion. By defining the function based on the virtual angle range, normal angle range, carrier angle range, and commonly used angle range, the system ensures that even when there is a mismatch between the virtual and carrier angle ranges, the transformed carrier rotation angle more accurately reflects the virtual experience. Accordingly, the user's sense of immersion is enhanced.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. Of course, the disclosed embodiments are merely exemplary embodiments and that various modifications can be made without departing from the spirit and scope of the disclosure. Further, it should be understood that various aspects of the embodiment are not mutually exclusive of each other and can be combined as desired by a person of ordinary skill in the art as a matter of design choices.

The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of"

the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:

1. A virtual reality control system, comprising:

a base;

a dynamic carrier that is disposed on the base and is configured to move along at least one rotational axis; and a control device that is connected to the dynamic carrier and is configured to determine a virtual rotation angle corresponding to a virtual operation, convert the virtual rotation angle into a carrier rotation angle using an angle conversion function, and control the rotational movement of the dynamic carrier based on the carrier rotation angle, wherein the angle conversion function is a nonlinear function that maps a virtual angle range to a carrier angle range in a nonlinear manner, and wherein the nonlinear function applies different conversion rates to different portions of the virtual angle range based on a distribution of rotation angles corresponding to user operations.

2. The virtual reality control system of claim 1, wherein the virtual angle range is greater than the carrier range.

3. The virtual reality control system of claim 1, further comprises a computing device that is connected to the control device, the computing device being configured to:

determine multiple simulated rotation angles corresponding to multiple simulated operations, each simulated rotation angle being within a simulated angle range, define a normal angle range based on the frequency of occurrence of the simulated rotation angles, determine the carrier angle range and define a commonly used angle range within the carrier angle range, and define the angle conversion function based on the simulated angle range, the normal angle range, the carrier angle range, and the commonly used angle range.

4. The virtual reality control system of claim 3, wherein the computing device is further configured to:

obtain a model function, determine a first coefficient of the model function based on the carrier angle range, and determine a second coefficient of the model function based on the virtual angle range, the normal angle range, and the commonly used angle range.

5. The virtual reality control system of claim 4, wherein the model function is defined as: y=a*tanh(bx), where y is the carrier control angle, x is the virtual angle, a is the first coefficient, and b is the second coefficient.

6. The virtual reality control system of claim 3, wherein the carrier angle range includes a first sub-range and a second sub-range, and the computing device is configured to:

obtain a segmented model function, determine a first coefficient for a first segment of the model function based on the first sub-range of the carrier angle range, determine a second coefficient for the first segment based on the virtual angle range, the normal angle range, and the commonly used angle range, determine a third coefficient for a second segment of the model function based on the second sub-range of the carrier angle range, and determine a fourth coefficient for the second segment based on the virtual angle range, the normal angle range, and the commonly used angle range.

7. The virtual reality control system of claim 6, wherein the segmented model function is defined as:

$$y = \begin{cases} a1 * \tanh(b1x), & x < 0 \\ a2 * \tanh(b2x), & x \geq 0 \end{cases},$$

where y is the carrier control angle, x is the virtual angle, a1 and b1 are coefficients corresponding to the first subrange, and a2 and b2 are coefficients corresponding to the second subrange.

8. The virtual reality control system of claim 1, further comprises a computing device that is configured to:

determine multiple first simulated rotation angles corresponding to a first rotational axis and multiple second simulated rotation angles corresponding to a second rotational axis, wherein the first simulated rotation angles are within a first simulated angle range and the second simulated rotation angles are within a second simulated angle range;

define a first normal angle range based on the frequency of occurrence of the first simulated rotation angles and a second normal angle range based on the frequency of occurrence of the second simulated rotation angles;

determine a first carrier angle range and a second carrier angle range, and define a first commonly used angle range within the first carrier angle range and a second commonly used angle range within the second carrier angle range;

define a first angle conversion function based on the first simulated angle range, the first normal angle range, the first carrier angle range, and the first commonly used angle range; and define a second angle conversion function based on the second simulated angle range, the second normal angle range, the second carrier angle range, and the second commonly used angle range.

9. A virtual reality control method executed by a control device, the method comprising:

determining a virtual rotation angle corresponding to a virtual operation;

converting the virtual rotation angle into a carrier rotation angle using an angle conversion function; and controlling the rotational movement of a dynamic carrier based on the carrier rotation angle, wherein the angle conversion function is a nonlinear function that maps a virtual angle range to a carrier angle range in a nonlinear manner, and wherein the nonlinear function applies different conversion rates to different portions of the virtual angle range based on a distribution of rotation angles corresponding to user operations.

10. The method of claim 9, wherein the virtual angle range is greater than the carrier angle range.

11. The method of claim 9, further comprising:

determining multiple simulated rotation angles corresponding to multiple simulated operations, each simulated rotation angle being within a simulated angle range;

defining a normal angle range based on the frequency of occurrence of the simulated rotation angles;

determining the carrier angle range and defining a commonly used angle range within the carrier angle range; and defining the angle conversion function based on the simulated angle range, the normal angle range, the carrier angle range, and the commonly used angle range.

12. The method of claim 11, wherein defining the angel conversion function comprises:

obtaining a model function;

determining a first coefficient of the model function based on the carrier angle range; and determining a second coefficient of the model function based on the virtual angle range, the normal angle range, and the commonly used angle range.

13. The method of claim 12, wherein the model function is defined as: y=a*tanh(bx), where y is the carrier control angle, x is the virtual angle, a is the first coefficient, and b is the second coefficient.

14. The method of claim 11, wherein defining the angel conversion function comprises:

obtaining a segmented model function;

determining a first coefficient for a first segment of the model function based on a first sub-range of the carrier angle range;

determining a second coefficient for the first segment based on the virtual angle range, the normal angle range, and the commonly used angle range;

determining a third coefficient for a second segment of the model function based on a second sub-range of the carrier angle range; and determining a fourth coefficient for the second segment based on the virtual angle range, the normal angle range, and the commonly used angle range.

15. The method of claim 14, wherein the segmented model function is defined as:

$$y = \begin{cases} a1 * \tanh(b1x), & x < 0 \\ a2 * \tanh(b2x), & x \geq 0 \end{cases},$$

where y is the carrier control angle, x is the virtual angle, a1 and b1 are coefficients corresponding to the first subrange, and a2 and b2 are coefficients corresponding to the second subrange.

16. The method of claim 9, further comprising:

determining multiple first simulated rotation angles corresponding to a first rotational axis and multiple second simulated rotation angles corresponding to a second rotational axis, wherein the first simulated rotation angles are within a first simulated angle range and the second simulated rotation angles are within a second simulated angle range;

defining a first normal angle range based on the frequency of occurrence of the first simulated rotation angles and a second normal angle range based on the frequency of occurrence of the second simulated rotation angles;

determining a first carrier angle range and a second carrier angle range, and define a first commonly used angle range within the first carrier angle range and a second commonly used angle range within the second carrier angle range;

defining a first angle conversion function based on the first simulated angle range, the first normal angle range, the first carrier angle range, and the first commonly used angle range; and defining a second angle conversion function based on the second simulated angle range, the second normal angle range, the second carrier angle range, and the second commonly used angle range.

17. A method for generating an angle conversion function executed by a computing device within a virtual reality control system, the method comprising:

determining multiple simulated rotation angles corresponding to multiple simulated operations, each simulated rotation angle being within a simulated angle range, defining a normal angle range based on the frequency of occurrence of the simulated rotation angles, determining the carrier angle range and define a commonly used angle range within the carrier angle range, and defining the angle conversion function based on the simulated angle range, the normal angle range, the carrier angle range, and the commonly used angle range.

18. The method of claim 17, wherein defining the angle conversion function further comprises:

obtaining a model function, determining a first coefficient of the model function based on the carrier angle range, and determining a second coefficient of the model function based on the virtual angle range, the normal angle range, and the commonly used angle range, wherein the model function is defined as: y=a*tanh(bx), where y is the carrier control angle, x is the virtual angle, a is the first coefficient, and b is the second coefficient.

19. The method of claim 17, wherein defining the angle conversion function further comprises:

obtaining a segmented model function, determining a first coefficient for a first segment of the model function based on a first sub-range of the carrier angle range, determining a second coefficient for the first segment based on the virtual angle range, the normal angle range, and the commonly used angle range, determining a third coefficient for a second segment of the model function based on q second sub-range of the carrier angle range, and determining a fourth coefficient for the second segment based on the virtual angle range, the normal angle range, and the commonly used angle range, wherein the segmented model function is defined as:

$$y = \begin{cases} a1 * \tanh(b1x), & x < 0 \\ a2 * \tanh(b2x), & x \geq 0 \end{cases},$$

where y is the carrier control angle, x is the virtual angle, a1 and b1 are coefficients corresponding to the first subrange, and a2 and b2 are coefficients corresponding to the second subrange.

20. The method of claim 17, further comprising:

determining multiple first simulated rotation angles corresponding to a first rotational axis and multiple second simulated rotation angles corresponding to a second rotational axis, wherein the first simulated rotation angles are within a first simulated angle range and the second simulated rotation angles are within a second simulated angle range;

defining a first normal angle range based on the frequency of occurrence of the first simulated rotation angles and a second normal angle range based on the frequency of occurrence of the second simulated rotation angles;

determining a first carrier angle range and a second carrier angle range, and define a first commonly used angle range within the first carrier angle range and a second commonly used angle range within the second carrier angle range;

defining a first angle conversion function based on the first simulated angle range, the first normal angle range, the first carrier angle range, and the first commonly used angle range; and defining a second angle conversion function based on the second simulated angle range, the second normal angle range, the second carrier angle range, and the second commonly used angle range.

* * * * *